(12) United States Patent
Nishioka et al.

(10) Patent No.: US 7,959,303 B2
(45) Date of Patent: Jun. 14, 2011

(54) IMAGE DISPLAY DEVICE

(75) Inventors: Ken Nishioka, Daito (JP); Atsuya Hirano, Daito (JP); Atsuhiko Chikaoka, Daito (JP); Hiroshi Nishigaki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 315 days.

(21) Appl. No.: 12/393,792

(22) Filed: Feb. 26, 2009

(65) Prior Publication Data
US 2009/0237622 A1 Sep. 24, 2009

(30) Foreign Application Priority Data
Mar. 19, 2008 (JP) .................................. 2008-072022

(51) Int. Cl.
B41J 2/435 (2006.01)
(52) U.S. Cl. ...... 353/85; 347/236; 347/237; 250/370.15
(58) Field of Classification Search ................ 353/28, 353/85, 122; 347/236, 237; 250/370.15
See application file for complete search history.

(56) References Cited

U.S. PATENT DOCUMENTS

| 6,169,563 | B1 | 1/2001 | Doi | |
|---|---|---|---|---|
| 6,388,689 | B1 * | 5/2002 | Toda et al. | 347/132 |
| 6,664,996 | B2 * | 12/2003 | Mano | 347/236 |
| 7,425,073 | B2 * | 9/2008 | Wood et al. | 353/28 |
| 7,561,176 | B2 * | 7/2009 | Westerfield et al. | 347/236 |
| 7,661,828 | B2 * | 2/2010 | Allen et al. | 353/79 |
| 2001/0048406 | A1 | 12/2001 | Masumoto et al. | |

FOREIGN PATENT DOCUMENTS

| EP | 2112832 A1 | 10/2009 |
|---|---|---|
| JP | 2003-5110 | 1/2003 |
| JP | 2003-172900 | 6/2003 |
| JP | 2006-133558 | 5/2006 |
| JP | 2007-3687 | 1/2007 |
| JP | 2007-57555 | 3/2007 |

OTHER PUBLICATIONS

Patent Abstracts of Japan for Japanese Publication No. 2003-005110, Publication date Jan. 8, 2003 (1 page).
Patent Abstracts of Japan for Japanese Publication No. 2007-057555, Publication date Mar. 8, 2007 (1 page).
Patent Abstracts of Japan for Japanese Publication No. 2007-003687, Publication date Jan. 11, 2007 (1 page).
Patent Abstracts of Japan for Japanese Publication No. 2006-133558, Publication date May 25, 2006 (1 page).
Patent Abstracts of Japan for Japanese Publication No. 2003-172900, Publication date Jun. 20, 2003 (1 page).
Extended European Search Report for patent application No. 09002062.9, dated Nov. 11, 2010, 11 pages.

* cited by examiner

*Primary Examiner* — Seung C Sohn
(74) *Attorney, Agent, or Firm* — Osha Liang LLP

(57) ABSTRACT

When a position detector detects that the position of a spot on a projection plane designates a non-projection region, the level of a driving signal of a laser is corrected. Specifically, the correlation between the quantity of laser light detected by a light-receiving portion and the level of the driving signal of the laser in accordance with prescribed data is detected. Then, the characteristic value of the laser indicated by the detected correlation is compared with the characteristic value at room temperature stored beforehand to indicate the correlation between the quantity of light emitted by the laser at room temperature and the level of the driving signal. Then, based on the comparison result, the level of the driving signal of the laser in accordance with image data is corrected.

10 Claims, 9 Drawing Sheets

IMAGE DISPLAY DEVICE

BACKGROUND OF THE INVENTION

1. Field of the Invention

The present invention relates to an image display device, and more particularly to an image display device displaying an image by applying laser light onto a projected plane.

2. Description of the Background Art

Image display devices displaying images by applying laser light onto projected planes such as screens or walls include so-called laser projectors. In a laser projector, laser lights of three primary colors of red, green and blue need to be prepared in order to reproduce images in full color. The configurations concerning image display using laser light in this manner are proposed in the followings.

Japanese Patent Laying-Open No. 2003-005110 discloses an apparatus two-dimensionally scanning light, in which projection of a pattern used for sensing the quantity of light is prevented.

Japanese Patent Laying-Open No. 2007-057555 discloses an image display device capable of displaying high-quality images with brightness variations sufficiently reduced using a plurality of light beams.

Japanese Patent Laying-Open No. 2007-003687 discloses a configuration to display images by two-dimensionally scanning luminous flux modulated based on image information and emitted from light source means.

Japanese Patent Laying-Open No. 2006-133558 discloses a configuration for easily displaying images of high resolution and images having many gradation levels, with accurate gradation.

Japanese Patent Laying-Open No. 2003-172900 discloses a configuration to promote size and weight reduction and cost reduction of a projector apparatus and to alleviate the effect of a light source on vision by simplifying a basic structure.

It is known that when a laser diode is powered for a long time, the temperature of the laser diode itself changes and thus the response characteristic changes with the temperature change. In other words, the output power of light with respect to the level of current applied to the laser diode for driving decreases with increasing temperature. As a result, the quantity of light which should be achieved for a prescribed gradation at room temperature cannot be achieved at a time of a temperature rise, so that the image quality of display images is reduced. Therefore, it has been desired that the image quality of display images is appropriately maintained irrespective of such a response characteristic change.

In this respect, Japanese Patent Laying-Open No. 2003-005110 proposes that special pattern information is prepared, the quantity of light output by driving a laser diode according to the pattern information is monitored, and the reference value of the driving current of the laser diode is updated based on the monitor result. However, special pattern information needs to be prepared. Moreover, special control is required so that an image according to the pattern information is not displayed, thereby complicating the configuration.

Furthermore, Japanese Patent Laying-Open Nos. 2007-057555 and 2007-003687 show a configuration in which the quantity of applied beam light is detected and driving of a laser diode is controlled according to the detection result. However, such a response characteristic change of a laser diode is not considered in correction.

Japanese Patent Laying-Open Nos. 2006-133558 and 2003-172900 do not show control of driving of a laser diode considering such a response characteristic change of a laser diode, either.

SUMMARY OF THE INVENTION

An object of the present invention is to provide an image display device capable of adjusting the quantity of light in response to output variations of a laser with a simple configuration.

In accordance with an aspect of the present invention, an image display device irradiating a projection with laser light plane for displaying an image on the projection plane has a configuration as follows.

The image display device includes: a laser receiving a provided driving signal and outputting the laser light with a quantity of light in accordance with a level of the received driving signal; an irradiation position control unit controlling a spot position on the projection plane to be irradiated with the laser light in accordance with image data; a position detection unit detecting a position of a spot of the laser light on the projection plane controlled by the irradiation position control unit; a quantity of light detection unit detecting a quantity of light of the laser light output by the laser; and a driving signal correction unit correcting a level of the driving signal.

The projection plane includes a projection region on which the image is projected when the laser receives the driving signal in accordance with image data and a non-projection region irradiated with the laser light when the laser receives the driving signal in accordance with prescribed data. The non-projection region is a region for the irradiation position control unit to move the spot of the laser light to the projection region.

When the position detection unit detects that a position of the spot exists in the non-projection region, the driving signal correction unit detects a correlation between a quantity of light detected by the quantity of light detection unit and a level of the driving signal in accordance with the prescribed data and compares a detection characteristic value of the laser indicated by the detected correlation with a characteristic value at room temperature of the laser indicating a correlation between the quantity of light of the laser and a level of the driving signal at room temperature to correct the level of the driving signal in accordance with the image data based on a comparison result.

Preferably, the driving signal includes a threshold signal for the laser to start emission and a gradation signal designating a gradation of the image in accordance with the image data. The driving signal correction unit corrects a level of the threshold signal and a level of the gradation signal based on the comparison result.

Preferably, the image display device further includes a maximum luminance driving unit outputting to the laser the driving signal having a level for outputting laser light at maximum luminance indicated by the characteristic value at room temperature when the position detection unit detects that the position of the spot exists in the non-projection region. The driving signal correction unit compares a quantity of light detected by the quantity of light detection unit when the driving signal is output to the laser by the maximum luminance driving unit with a quantity of light specified by the maximum luminance indicated by the characteristic value at room temperature to correct a level of the gradation signal based on a comparison result.

Preferably, in a period of time during which the position detection unit detects that the position of the spot exists in the no-projection region, the irradiation position control unit fixes a spot position on the projection plane to be irradiated with the laser light.

Preferably, when the position detection unit detects that the position of the spot exists in the non-projection region, a quantity of light detected by the quantity of light detection unit is an average value of the quantity of light detected pixel by pixel in the non-projection region.

In accordance with the present invention, a value indicated by the correlation between the quantity of light detected when laser light is applied using a driving signal in accordance with prescribed data in the non-projection region and a level of the driving signal is detected, and based on the result of comparison between the detected value and a value indicating the correlation at room temperature of the laser, the level of the driving signal in accordance with the image data for image display in the projection region is corrected.

Accordingly, even if variations in laser output power occur, the output variations are corrected so that the accuracy of laser light output control in the projection region can be enhanced. As a result, even without preparation of a special region for image pattern display for correcting output variations, gradation representation errors of display images caused by laser output variations are reduced, thereby improving the quality of display images with a simplified configuration.

In addition, since correction of output variations is performed based on the result of comparison with a value indicating the correlation at room temperature of the laser, a change in output power due to a temperature change of the laser itself can be compensated for.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, an embodiment of the present invention will be described with reference to the drawings. In the following description, the same parts are denoted with the same characters. The designations and functions are also the same. Therefore, the detailed description thereof will not be repeated.

An image display device in accordance with the present embodiment displays images on projection planes such as screens or walls by scanning images to be displayed with laser light emitted from an LD (Laser Diode) as a light source. For example, the image display device corresponds to a laser projector. LD has such a characteristic in that the luminance of laser light changes with changing temperature of the device. In the image display device, current to be applied to LD (referred to as driving current) is corrected so that the luminance required by the image to be displayed is obtained irrespective of this characteristic. This enables accurate gradation control for the image to be displayed and enables projection of images with smooth color changes.

Figure 1:
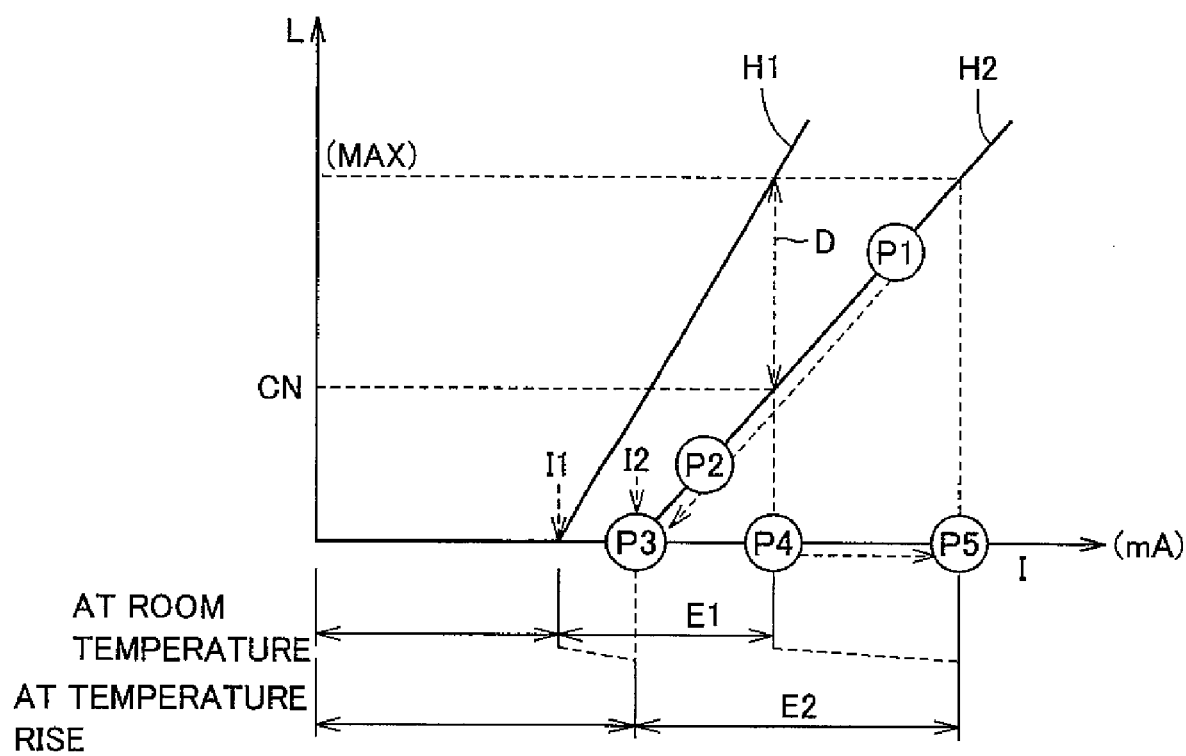
FIG. 1 is a diagram showing the characteristics of a laser diode in accordance with an embodiment of the present invention.

Now, referring to FIG. 1, the procedure of determining the correction amount of driving current I of LD. FIG. 1 shows a slope efficiency (output light intensity L/driving current I (mA)) of LD. The light intensity corresponds to luminance or the quantity of light. As shown in FIG. 1, the threshold current applied to LD and the slope efficiency (output light intensity L/driving current I (mA)) change with changing temperature of the LD itself In other words, LD generates heat at the junction portion and the temperature of the device itself rises as it is powered for a longer time. With increasing temperature, the outputtable maximum light intensity decreases and the operation range of LD becomes narrower. This operation range corresponds to gradation control regions E1, E2 for controlling the gradation in image display. In FIG. 1, the slope efficiency changes according to a straight line H1 when LD is at room temperature, while the slope efficiency changes according to a straight line H2 when the temperature rises.

Therefore, when it is assumed that an image is displayed according to maximum "256" gradation, for example, at room temperature, LD starts emission with application of threshold current I1, and thereafter by increasing driving current I, an image with maximum 256 gradation (maximum luminance MAX can be displayed. The range from threshold current I1 to the driving current for displaying the image with maximum gradation is called gradation control region E1. The image up to maximum gradation "256" can be displayed by controlling driving current I in the range shown by gradation control region E1.

On the other hand, when the LD itself has the temperature increased because of being powered for a long time, the slope efficiency changes as shown by straight line H2. In other words, since LD starts emission with application of threshold current I2 (>I1), the desired gradation cannot be obtained even by controlling driving current I within gradation control region E1, at the time of a temperature rise. For example, even if maximum driving current I within gradation control region E1 is applied to LD for displaying an image with gradation "256," only luminance CN (<MAX) can be obtained as for light intensity L of emission light of LD. In other words, the luminance is decreased by difference D (D=MAX−CN). Therefore, at a temperature rise, even if driving current I is controlled in gradation control region E1 at room temperature, an image according to the gradation specified by image data cannot be displayed and the image quality of a display image deteriorates.

In order to avoid this, in the present embodiment, current to be applied to LD (referred to as driving current) is corrected in accordance with the temperature characteristic of LD so that the luminance requested by an image to be displayed is obtained.

Figure 2:
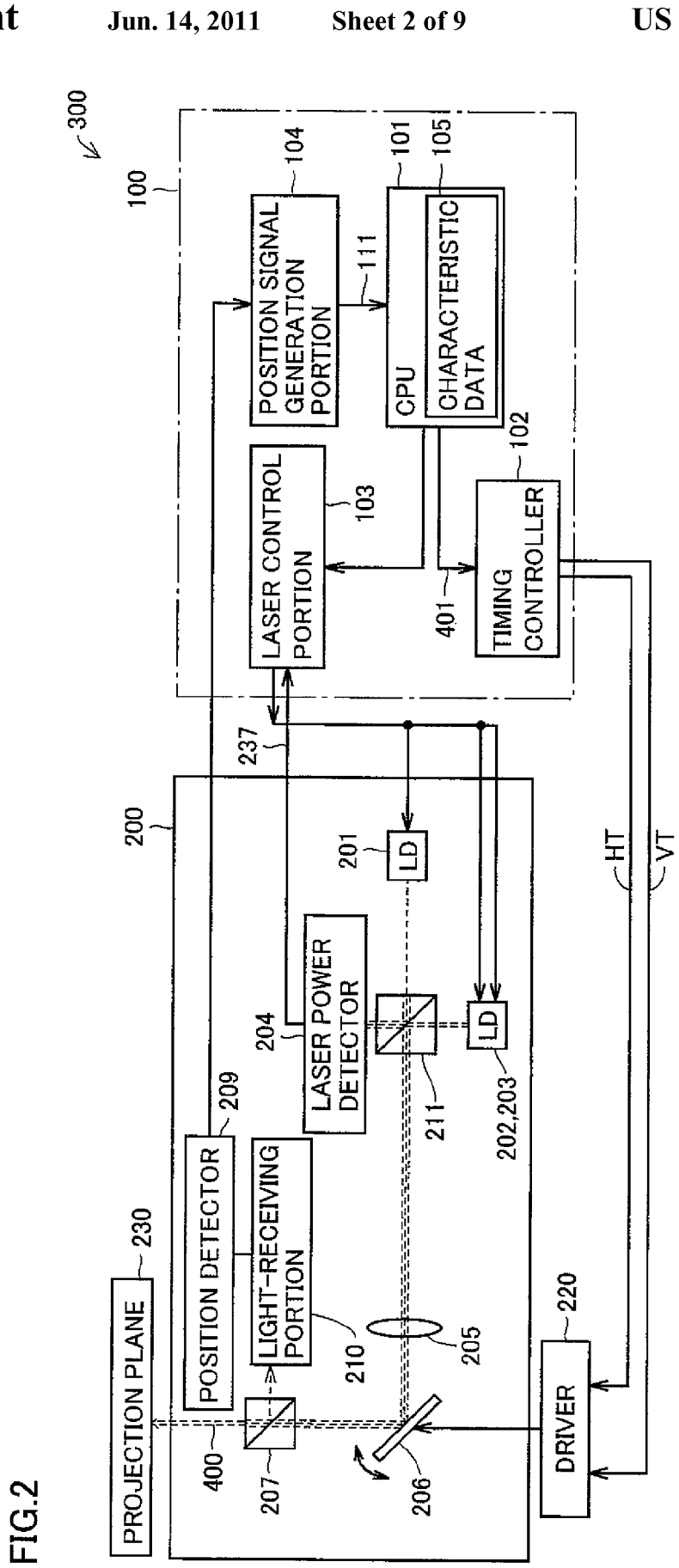
FIG. 2 is a hardware configuration diagram of an image display device in accordance the embodiment of the present invention.

Referring to FIG. 2, an image display device 300 in accordance with the embodiment of the present invention includes a display control unit 100 and an optics unit 200 and further includes a driver 220 driving an XY scanner mirror 206 as described later to vibrate and controlling the inclination of the mirror surface thereof The laser light emitted from optics unit 200 is applied to a projection plane 230 such as screens or walls provided outside of image display device 300.

Display control unit 100 includes a CPU (Central Processing Unit) 101 for controlling image display device 300 itself, a timing controller 102 outputting a horizontal drive timing signal HT and a vertical drive timing signal VT to designate the timing of control for driver 220, a laser control portion 103 for controlling emission of laser light by LD, and a position signal generation portion 104. CPU 101 stores in advance characteristic data 105 shown by straight line H1 in FIG. 1 for each of red, green, and blue lasers 202, 201, and 203 in a prescribed memory region. Characteristic data 105 is detected in advance by experiment or the like and stored for each of red, green, and blue lasers 202, 201, and 203.

In a period of time during which projection plane 230 is irradiated with laser light, position signal generation portion 104 generates a position signal 111 indicating the irradiated position and outputs the same to CPU 101. The irradiated position corresponds to the position of a spot of laser light on projection plane 230.

Optics unit 200 includes a green laser 201 that is an LD outputting green laser light, a red laser 202 that is an LD outputting red laser light, a blue laser 203 that is an LD outputting blue laser light, a laser power detector 204, a beam splitter 211, a lens 205, XY scanner mirror 206, a half mirror 207, a position detector 209, and a light-receiving portion 210. Laser power detector 204 is formed of a photo diode. Laser power detector 204 receives mixed light from green laser 201, red laser 202, and blue laser 203 to detect the quantity of received light. In other words, a current signal corresponding to the quantity of received light is output. The current signal is output as a quantity of light detection signal 237 to laser control portion 103.

Beam splitter 211 receives and mixes the laser lights output from green laser 201, red laser 202, and blue laser 203. The mixed three laser light beams become one luminous flux. Beam splitter 211 divides and outputs the laser light obtained by mixture to laser power detector 204 and lens 205. The divided laser light output to lens 205 has the quantity of light that can display an image on projection plane 230.

The laser light output to lens 205 enters XY scanner mirror 206 through lens 205, and the incident light is reflected at the mirror surface thereof The reflected light then enters half mirror 207. In XY scanner mirror 206, the inclination of the mirror surface is controlled by driver 220. Thus, the position of the spot of laser light 400 applied to projection plane 230 through half mirror 207 is moved in connection with the inclination of the mirror surface.

Half mirror 207 receives light reflected at the mirror surface of XY scanner mirror 206 and allows the most of light to pass through for output to projection plane 230 while allowing a part of light to be reflected for output to light-receiving portion 210.

A light-receiving surface of light-receiving portion 210 receives light output from half mirror 207. The light-receiving surface is formed of a plurality of photodiode devices as two-dimensionally arranged. Here, the shape and size of the light-receiving surface of light-receiving portion 210 is determined by reducing the shape and size of projection plane 230 at a prescribed ratio. Therefore, by detecting a photodiode device at which position of the light-receiving surface receives laser light, the position on projection plane 230 corresponding to that position can be detected.

Light-receiving portion 210 detects output signals of a plurality of photodiode devices on the light-receiving surface according to the order allocated to photodiode devices in advance and detects whether or not the photodiode device receives the laser light based on the detected signal. Light-receiving surface 210 detects the photodiode device that receives light and then outputs data of the order allocated to the photodiode device to position detector 209.

Position detector 209 stores in advance a table in which data of the order and data of the position on the light-receiving surface of the photodiode device are associated with each other for each of a plurality of photodiode devices on the light-receiving surface. Therefore, position detector 209 reads data of the corresponding position by searching the table based on data of the order input from light-receiving portion 210 and outputs the read data to position signal generation portion 104.

Position signal generation portion 104 receives the position data from position detector 209 and converts the received position data into data of the corresponding position in projection plane 230. Then, based on the position data in projection plane 230 which is obtained through conversion, position signal 111 is generated and output to CPU 101.

Position signal generation portion 104 stores in advance a table for conversion of the position data. Since the shape and size of the light-receiving surface of light-receiving portion 210 is determined by reducing the shape and size of projection plane 230 at a prescribed ratio, as described above, data of the positions in light-receiving surface of a plurality of photodiode devices on the light-receiving surface and data of the corresponding position in projection plane 230 are related with each other in accordance with the prescribed ratio and stored in this table. Position signal generation portion 104 can read the related position data, that is, data of the corresponding position in projection plane 230 by searching the table based on the position data input from position detector 209.

Figure 3:
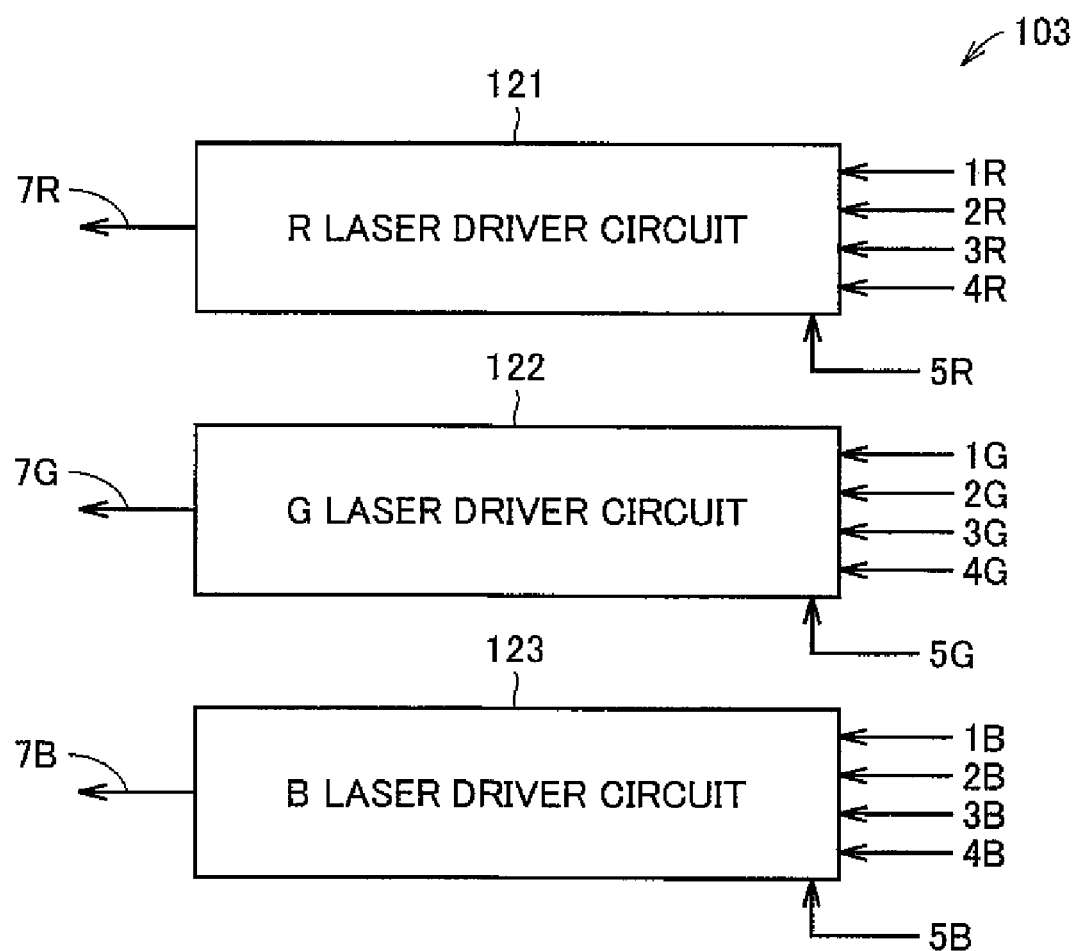
FIG. 3 is a schematic configuration diagram of a laser control portion in accordance with the embodiment of the present invention.

Referring to FIG. 3, laser control portion 103 includes laser driver circuits 121, 122, and 123 respectively corresponding to red laser 202, green laser 201, and blue laser 203.

Figure 4:
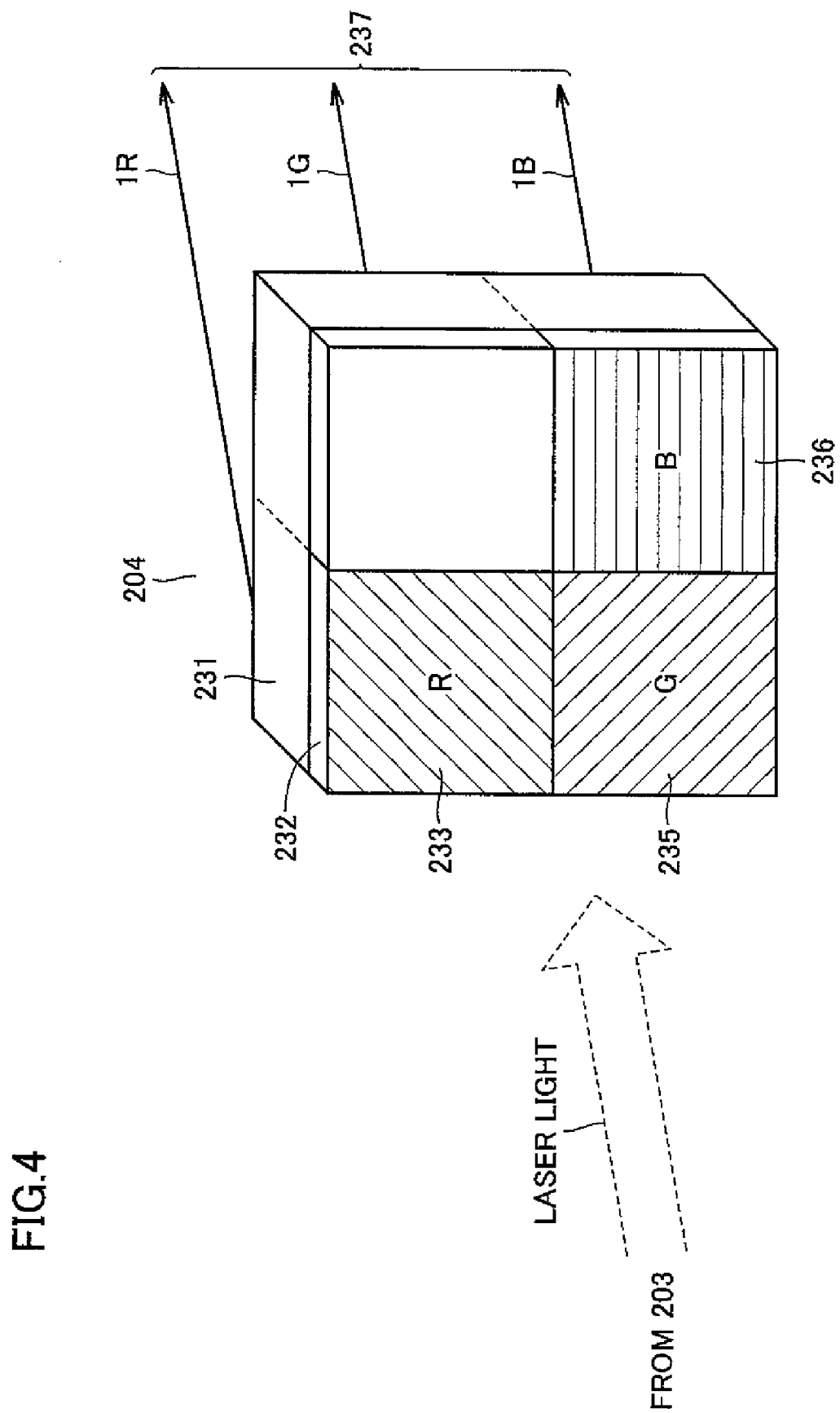
FIG. 4 is a configuration diagram of a laser power detector in accordance with the embodiment of the present invention.

Referring to FIG. 4, laser power detector 204 has regions 233, 235, and 236 for detecting light with the corresponding wavelength, corresponding to light with the red wavelength, light with the green wavelength, and light with the blue wavelength. Each of these regions is integrally formed of a photodiode 231 and a color filter 232. Specifically, in each region, color filter 232 is integrally attached to the light-receiving surface of photodiode 231. The color filter of each region has the characteristic for allowing only light with the wavelength corresponding to that region to pass through. Therefore, in each region, only light of the corresponding color passes through color filter 232 and is then detected by photodiode 231. The light detected by photodiode 231 in each region is output to laser driver circuits 121, 122, and 123 of laser control portion 103 as quantity of light detection signals 1R, 1G, and 1B, respectively, which are current signals corresponding to the quantity of received light. Quantity of light detection signal 237 applied to laser control portion 103 includes quantity of light detection signals 1R, 1G, and 1B.

It is noted that quantity of light detection signal 237 may be amplified and then applied to laser control portion 103 so as to facilitate the subsequent signal processing.

Here, laser power detector 204 is not limited to the configuration as described above. For example, in place of color filter 232, a filter having the characteristic of allowing light with the wavelengths of red laser light, green laser light, and blue laser light to pass through may be provided. In this case, red laser light, green laser light, and blue laser light are emitted in chronological order, so that quantity of light detection signals 1R, 1G, and 1B can be derived in chronological order.

Figure 5:
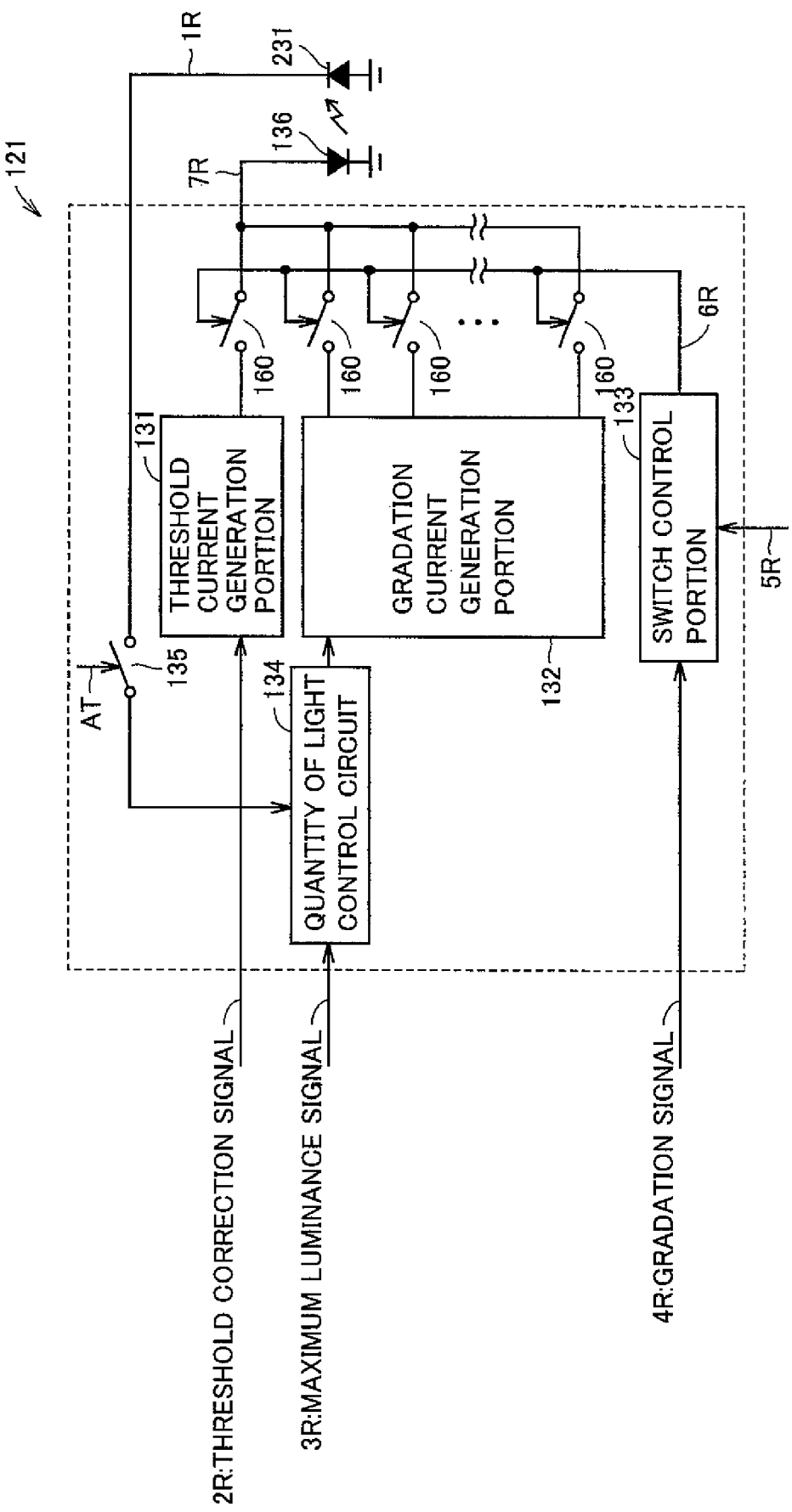
FIG. 5 is a schematic configuration diagram of a laser driver circuit in accordance with the embodiment of the present invention.

FIG. 5 shows a schematic configuration of laser driver circuit 121. Laser driver circuit 122 and laser driver circuit 123 have the configuration and function similar to that of laser driver circuit 121, and therefore laser driver circuit 121 will be described here. Signals 1R-7R of laser driver circuit 121 correspond to signals 1G-7G of laser driver circuit 122 and signals 1B-7B of laser driver circuit 123, and therefore the description of these signals 1G-7G and 1B-7B will be omitted.

Figure 6:
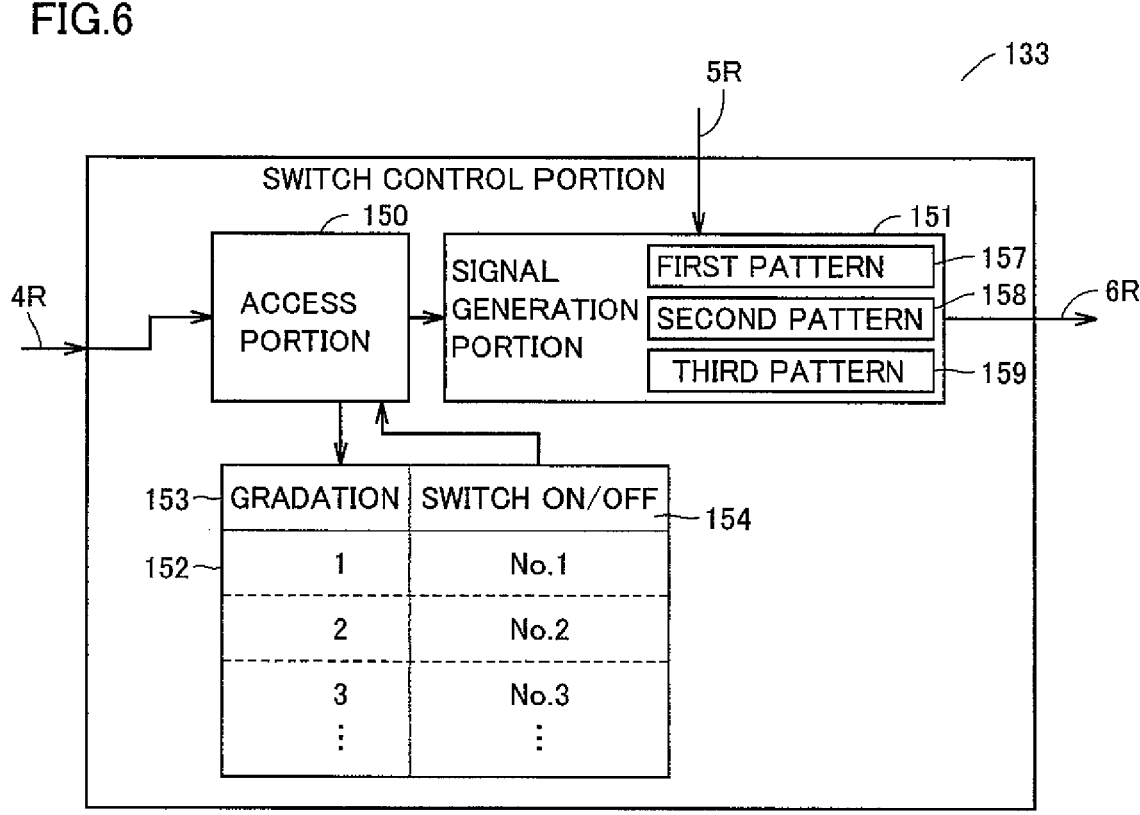
FIG. 6 is a functional configuration diagram of a switch control portion in accordance with the embodiment of the present invention.

Referring to FIG. 5, laser driver circuit 121 includes a threshold current generation portion 131, a gradation current generation portion 132, a switch control portion 133 shown in FIG. 6, a quantity of light control circuit 134 having a function of controlling and correcting driving current for gradation control, a switch 135, and a plurality of switches 160.

Switch 135 is controlled by a signal AT as described later. Only in a period during which signal AT is in "ON" state, the switch is closed. In a period during which switch 135 is closed, quantity of light control circuit 134 is connected with photodiode 231 in region 233 shown in FIG. 4, so that quantity of light detection signal 1R output by photodiode 231 is input to quantity of light control circuit 134. In a period during which signal AT is in "OFF" state, the switch is in the open state. In the open period, quantity of light control circuit 134 is not connected with photodiode 231, and therefore quantity of light detection signal 1R is not applied to quantity of light control circuit 134.

A plurality of switches 160 are controlled by signal 6R output from switch control portion 133. One of a plurality of switches 160 has the input terminal connected to threshold current generation portion 131 to receive the output signal from threshold current generation portion 131 and has the output terminal connected to the input stage of laser diode 136. Each of the other switches 160 has the input terminal connected to gradation current generation portion 132 to receive the output signal from gradation current generation portion 132 and has the output terminal connected to the input stage of laser diode 136 corresponding to red laser 202.

Switch control portion 133 outputs signal 6R to a plurality of switches 160 and individually controls open/close of switch 160 by signal 6R.

Here, referring to FIG. 7, movement of a spot of laser light on projection plane 230 will be described in relation to scanning of an image to be displayed. Here, projection plane 230 is a rectangular plane of two-dimensional coordinates defined by the X-axis and the Y-axis (the X-axis extending in the horizontal direction and the Y-axis extending in the vertical direction) orthogonal to each other. When an image starts to be displayed, a spot by laser light emitted from image display device 300 is present at the upper left end of projection plane 230 corresponding to the origin (the intersection of the X-axis and the Y-axis) of the two-dimensional coordinates. The spot starts moving from this point and moves toward the lower right end as shown by the dashed arrow in the figure in accordance with scanning of the image. This movement is realized by controlling the inclination of XY scanner mirror 206 according to horizontal driving signal HT and vertical driving signal VT.

Figure 7:
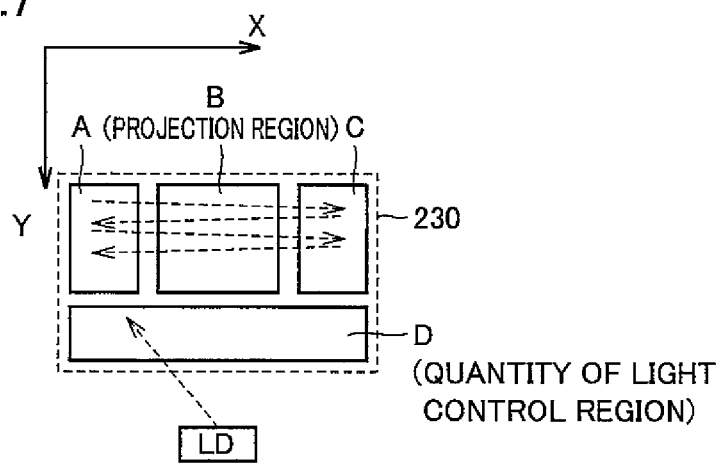
FIG. 7 is a diagram illustrating the movement of a spot of laser light on a projection plane in accordance with the embodiment of the present invention.

In the present embodiment, projection plane 230 is composed of regions A, B, C, and D, as shown in FIG. 7. Images of contents to be displayed such as movies and broadcasting programs are displayed only in region B. The other regions A, C, and D are non-projection regions in which images in accordance with data of contents are not displayed although laser light is applied, and are used for a spot of laser light to be moved to region B for projection.

Then, in the present embodiment, the intensity of laser light (quantity of light) is detected in regions A and C. Thereafter, in a period during which a laser light spot exists in region D, driving current to be applied to LD is corrected based on the quantity of light detection result in regions A and C. Accordingly, the quantity of emission light of LD is corrected so that luminance in accordance with the gradation requested by the image to be displayed is obtained.

Referring to FIG. 6, switch control portion 133 shown in FIG. 5 will be described. Switch control portion 133 includes a table 152 storing data 154 to selectively designate only a prescribed switch 160 to be closed among a plurality of switches 160 corresponding to the respective data 153 indicating gradations for displaying an image, an access portion 150, and a signal generation portion 151.

Switch control portion 133 generates and outputs to a plurality of switches 160 signal 6R for turning on/off the switches in accordance with the gradation indicated by the input gradation signal 4R when a spot exists in region B. Gradation signal 4R indicates the gradation for image display designated by image data. Signal 6R performs control to allow only a prescribed switch 160 to be selectively closed among a plurality of switches 160 and acts to allow other switches 160 to be kept open. Therefore, signal R7 which refers to driving current is supplied from threshold current generation portion 131 or gradation current generation portion 132 through the closed switch 160 to laser diode 136. Thus, the image to be displayed is allowed to be displayed in accordance with the gradation specified by image data.

Signal generation portion 151 stores beforehand data of first pattern 157, second pattern 158, and third pattern 159. The values of first to third patterns 157-159 are different from each other. First pattern 157 is data to selectively designate one or more switches 160 to be closed among a plurality of switches 160 when a laser light spot exists in region A. Similarly, second pattern 158 is data to selectively designate one or more switches 160 to be closed when a laser light spot exists in region C. Third pattern 159 is data to designate all of switches 160 to be closed when a laser light spot exists in region D.

Access portion 150 searches table 152 in accordance with the gradation data designated by gradation signal 4R to read data 154 corresponding to data 153 indicating the value matching the gradation data from table 152 for output to signal generation portion 151.

Signal generation portion 151 receives signal SR designating in which of regions A-D a laser light spot exists, when an image is displayed. Signal generation portion 151 operates based on signal 5R. When signal 5R designates region A, signal generation portion 151 reads first pattern 157 and generates and outputs signal 6R based on the read first pattern 157. When signal 5R designates region C, signal generation portion 151 reads second pattern 158 and generates and outputs signal 6R based on the read second pattern 158. When signal 5R designates region D, signal generation portion 151 reads third pattern 159 and generates and outputs signal 6R based on the read third pattern 159.

When signal 5R designates region B, signal 6R based on data 154 provided from access portion 150 is generated and output.

Data 154 is data to designate switch 160 to be closed among switches 160 in order to display an image with the gradation indicated by the corresponding data 153. For example, when it is assumed that image data includes data of eight bit length for designating gradation, the total number of switches 160 is eight and the maximum gradation is 28. For example, when gradation signal 4R designates the maximum gradation "256," signal 6R allows all the switches 160 to be closed and the maximum driving current to be supplied to laser diode 136. In this manner, signal 7R which is driving current to be applied to laser diode 136 is controlled by signal 6R, so that the quantity of light (light intensity) emitted from laser diode 136 can be controlled.

Gradation current generation portion 132 distributes a current signal based on the maximum luminance signal input from quantity of light control circuit 134 to the respective input terminals of a plurality of connected switches 160. For example, assuming that image data has data of n-bit length for designating gradation, n switches 160 are connected and the current signal based on the maximum luminance signal is distributed to n switches. The relation of current I supplied to each terminal is, for example, $I_{n-1}=I_n/2$. Alternatively, $2^n-1$ switches 160 may be connected so that current supplied to the terminal of each switch 160 is equal.

Here, it is assumed that when image display device 300 is powered on, the current signal based on the maximum luminance MAX at room temperature is distributed and supplied to the respective input terminals of a plurality of switches 160.

Figure 8:
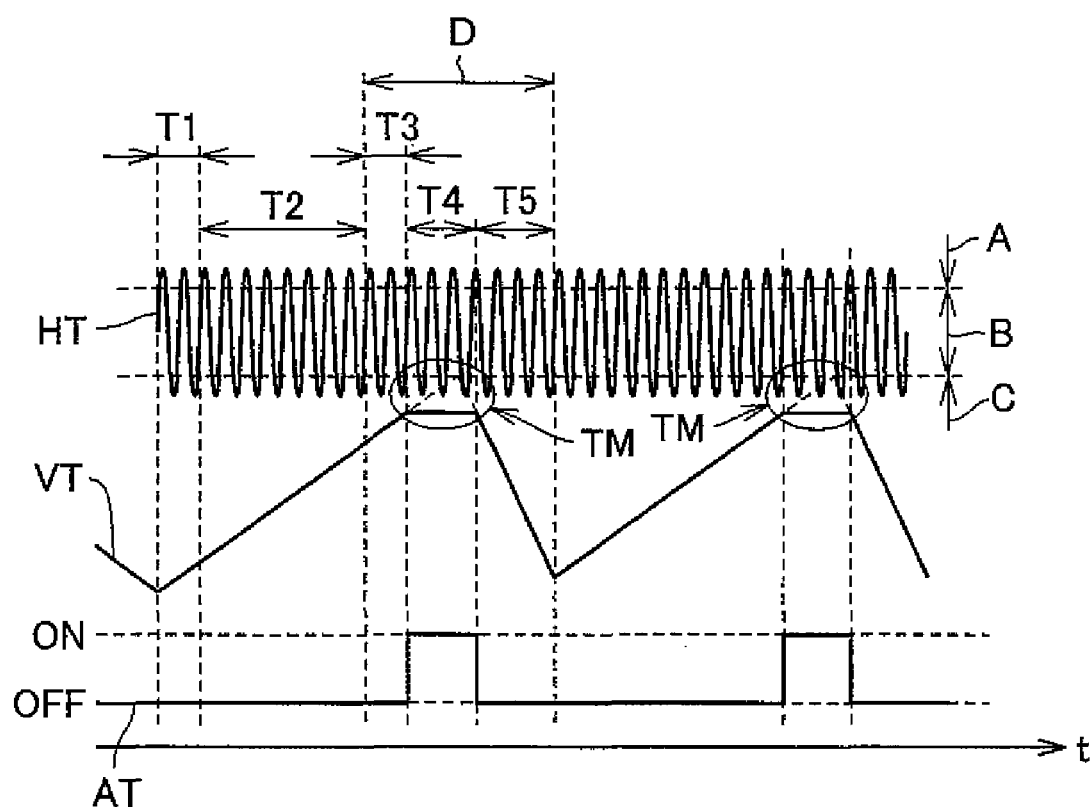
FIG. 8 is a diagram showing the drive timing of an XY scanner mirror and the timing of quantity of light control.

FIG. 8 shows the driving timing of XY scanner mirror 206 in relation to the timing of correcting the quantity of emission light of LD over time 't.'

Driver 220 generates a drive control signal of XY scanner mirror 206 based on horizontal drive timing signal HT and vertical drive timing signal VT output from timing controller 102 and outputs the generated drive control signal to XY scanner mirror 206.

As shown in FIG. 8, the period during which an image is displayed by horizontal drive timing HT and vertical drive timing VT mainly includes a period T2 for image projection in which a spot exists in region B, and non-projection periods T1, T3, T4, and T5 in which a spot does not exist in region B. Period T1 in FIG. 8 corresponds to the period during which a spot exists in region A or C in FIG. 7. Period T2 corresponds to the period during which a spot exists in region B. Periods T3, T4, and T5 correspond to the period during which a spot exists in region D.

In period T3, correction of the threshold current is made in association with the changing threshold current (I1→I2) due to a temperature change as shown in FIG. 1. Period T4 is a period during which the level of the maximum luminance signal is corrected as shown in FIG. 1. Period T5 is used as a period during which a laser light spot in region D is moved to the upper left end of projection plane 230 in FIG. 7 for the next image display. It is noted that in the present embodiment, in period T4, vertical drive timing VT is not changed and the laser light spot thus does not move in the vertical direction on projection plane 230.

Figure 9:
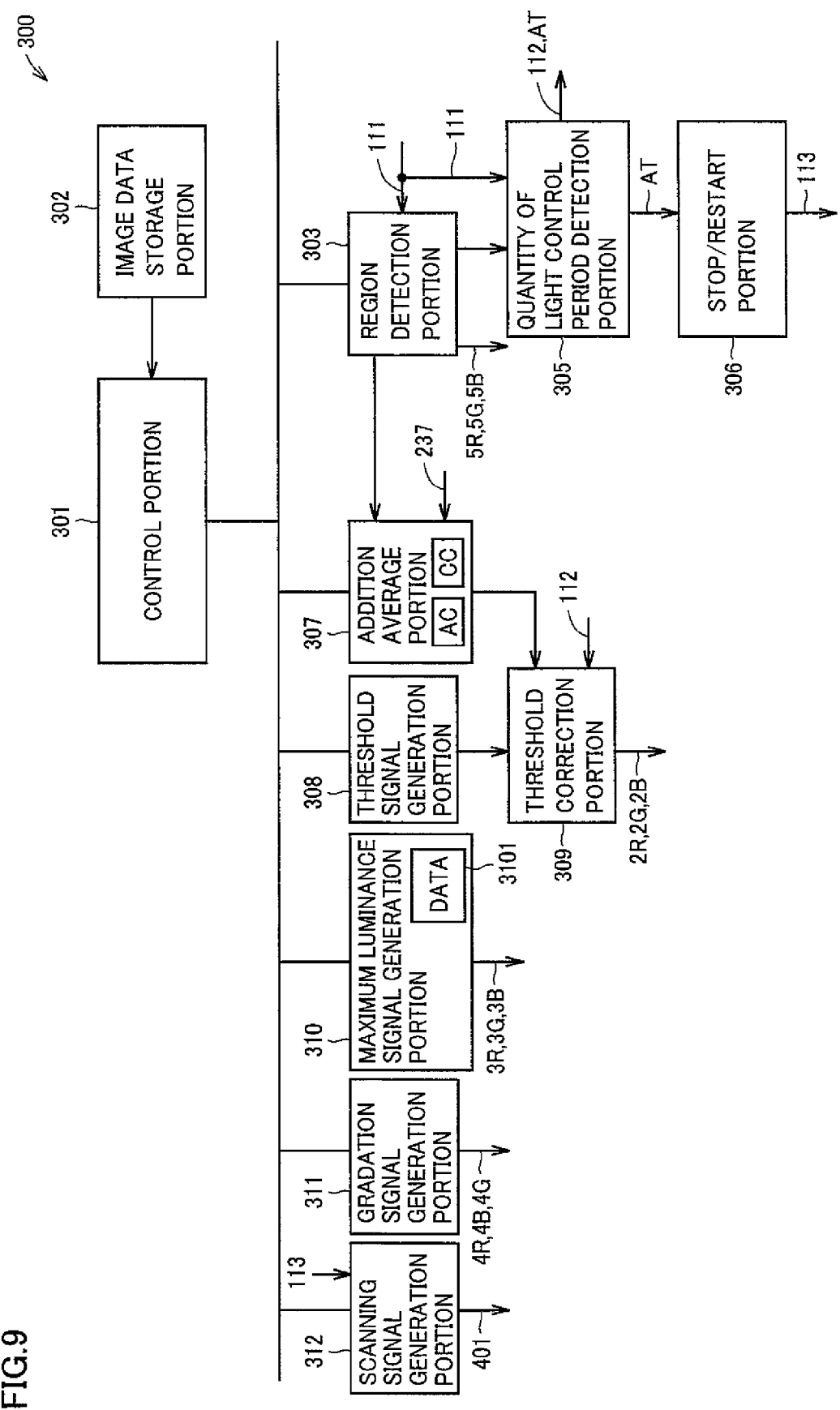
FIG. 9 is a functional configuration diagram of the image display device in accordance with the embodiment of the present invention.

FIG. 9 shows a functional configuration of image display device 300 in accordance with the present embodiment.

Image display device 300 in accordance with the present embodiment includes a control portion 301 corresponding to CPU 101, an image data storage portion 302 storing beforehand image data of contents to be displayed, a region detection portion 303, a quantity of light control period detection portion 305 outputting signal AT to designate period T4 for quantity of light control in FIG. 8 and a signal 112 to designate the start of period T3, a stop/restart portion 306 outputting an instruction signal 113 for controlling stop/restart of movement of a laser light spot in period T4, an addition average portion 307, a threshold signal generation portion 308 generating and outputting a signal designating threshold current I1, a threshold correction portion 309, a maximum luminance signal generation portion 310, a gradation signal generation portion 311, and a scanning signal generation portion 312.

Control portion 301 provides image data read from image data storage portion 302 to scanning signal generation portion 312 and gradation signal generation portion 311. Gradation signal generation portion 311 generates gradation signals 4R, 4B, 4G each designating the gradation of the image to be displayed, based on the provided image data, and outputs gradation signals 4R, 4B, 4G to laser driver circuits 121, 122, and 123, respectively. Scanning signal generation portion 312 receives image data and generates and outputs a signal 401 which determines the scanning timing of the image on projection plane 230 based on the received image data. Signal 401 output from scanning signal generation portion 312 is synchronized with gradation signals 4R, 4B, 4G output from gradation signal generation portion 311. Signal 401 is output as a signal of coordinates (X, Y) defining the two-dimensional coordinate plane in FIG. 7.

Region detection portion 303 receives position signal 111 designating the present spot position of laser light on projection plane 230 from position signal generation portion 104 and detects the region in which the present spot exists based on the received position signal 111. The detection result is output to quantity of light control period detection portion 305 and also output to laser driver circuits 121-123 as signals 5R, 5G, and 5B. Signal 111 is output as a signal of coordinates (X, Y) defining the two-dimensional coordinate plane in FIG. 7.

Region detection portion 303 stores beforehand data of address (coordinate data) which defines each of regions A, B, C, and D. In operation, the coordinates indicated by the input signal 111 are compared with the stored data. Then, it is detected in which of regions A, B, C, and D the present spot exists based on the comparison result, and signals 5R, 5G, and 5B indicating the detection result are output.

Quantity of light control period detection portion 305 generates and outputs signal AT at the bottom shown in FIG. 8 based on the signal output from region detection portion 303 and the input signal 111 and also outputs signal 112 designating the start of period T3 during which correction of the threshold current is to be made. Signal 112 designates the timing at which information indicated by the signal output from region detection portion 303 changes from information indicating the other regions to information designating 'region D.'

Stop/restart portion 306 generates signal 113 based on signal AT input from quantity of light control period detection portion 305 and outputs signal 113 to scanning signal generation portion 312. Signal 113 designates stop of movement of the spot on projection plane 230 in response to signal AT changing from "OFF" to "ON," and thereafter designates restart of movement in response to signal AT changing from "ON" to "OFF."

Scanning signal generation portion 312 receives signal 113 to generate and output signal 401 so that the signal level of vertical drive timing signal VT does not change in the period designated by the received signal 113, that is, the period during which signal AT in FIG. 8 is "ON." Therefore in the period during which signal AT is "ON," the laser light spot moves in the horizontal direction (the direction in which the X-axis extends) but does not move in the vertical direction (the direction in which the Y-axis extends).

Addition average portion 307 receives a signal of the region detection result from region detection portion 303 and quantity of light detection signal 237 from laser power detector 204. In operation, when it is determined that the input signal from region detection portion 303 designates that the spot exists in each of region A and region C in FIG. 7, the quantity of light data indicated by the input quantity of light detection signal 237 is added pixel by pixel, so that the average is calculated and the calculated value is stored. In other words, the average value of quantity of light data for region A is stored as an addition average value AC and the average value of quantity of light data for region C is stored as addition average CC in a prescribed memory.

Calculation and storage of addition average values AC and CC in addition average portion 307 is executed for each of quantity of light detection signals 1R, 1G, and 1B of quantity of light detection signal 237. Therefore, addition average values AC and CC are stored in addition average portion 307, corresponding to each of quantity of light detection signals 1R, 1G, and 1B.

Threshold signal generation portion 308 searches the corresponding data 105 of threshold current I1 at room temperature in FIG. 1 in accordance with the characteristic of LD, for each of red, green, and blue lasers 202, 201, and 203. In operation, data 105 is searched, and based on the data read through the search, a signal designating threshold current I1 is generated and output to threshold correction portion 309, for each of red, green, and blue lasers 202, 201, and 203.

Threshold correction portion 309 receives signal 112 and the signal from threshold signal generation portion 308. In operation, when the start of period T3 is detected based on signal 112, the signal from threshold signal generation portion 308 designating threshold current I1 for each of red, green, and blue lasers 202, 201, and 203 is corrected to a signal designating threshold current I2 in FIG. 1 (a signal of the correction result). Thus, threshold correction signals 2R, 2G, and 2B are generated. The generated threshold correction signals 2R, 2G, and 2B are respectively output to laser driver circuits 121, 122, and 123.

Here, threshold correction portion 309 outputs the signals from threshold signal generation portion 308 designating threshold current I1 as threshold correction signals 2R, 2G, and 2B, when image display device 300 is powered on.

Now, the correction operation by threshold correction portion 309 will be described. Threshold correction signals 2R, 2G, and 2B are calculated in the similar procedure, and therefore the correction operation is described here by illustrating the procedure of generating threshold correction signal 2R.

Characteristic data 105 of L-1 indicating the correlation between the driving current and the light intensity (the quantity of light) as shown by straight line H1 at room temperature in FIG. 1 is stored beforehand in a prescribed memory region of CPU 101. The correction is performed using characteristic data 105 read from this memory region. For the sake of illustration, points P1-P5 are shown in FIG. 1. First, when the start of period T3 is designated by signal 112, addition average values AC and CC for quantity of light detection signal 1R are read from addition average portion 307. Threshold correction portion 309 stores beforehand the values of driving current in accordance with first pattern 157 and second pattern 158. Therefore, in accordance with characteristic data 105, point P1 and point P2 in FIG. 1 are detected based on the stored values of driving current and the read addition average values AC and CC. Then, straight line H2 indicating the characteristic at a temperature rise is detected by detecting the straight line connecting those points specified by the detection. The expression of characteristic data indicating the correlation between the driving current and the light intensity at a temperature rise can be calculated by calculating the expression of the detected straight line H2. Then, on the extension of straight line H2, the value of point P3 indicating threshold current I2, that is, the value of threshold current I2 is calculated in accordance with the expression of straight line H2. Thus, the value of corrected threshold current I2 is detected, and threshold correction signal 2R designating the value of threshold current I2 is output.

In order to ensure that the corrected threshold current I2 is detected, the values of driving current in accordance with first pattern 157 and second pattern 158 are both greater than driving current I1, and more preferably, at least one of the values is greater than the maximum value in region E1.

Maximum luminance signal generation portion 310 stores beforehand data 3101 of driving current allowing emission light of each LD to attain the maximum gradation (maximum luminance MAX, the maximum quantity of light) at room temperature in accordance with image data, for each of red, green, and blue lasers 202, 201, and 203, as shown in FIG. 1. Therefore, when an image is displayed, the corresponding data 3101 is read for each of red, green, and blue lasers 202, 201, and 203. Then, based on the read data 3101, maximum luminance signals 3R, 3G, and 3B indicating the driving current values which allow the respective emission lights of red, green, and blue lasers 202, 201, and 203 to attain the maximum luminance MAX (the maximum quantity of light) at room temperature are generated and output to laser driver circuits 121, 122, and 123, respectively.

Figure 10:
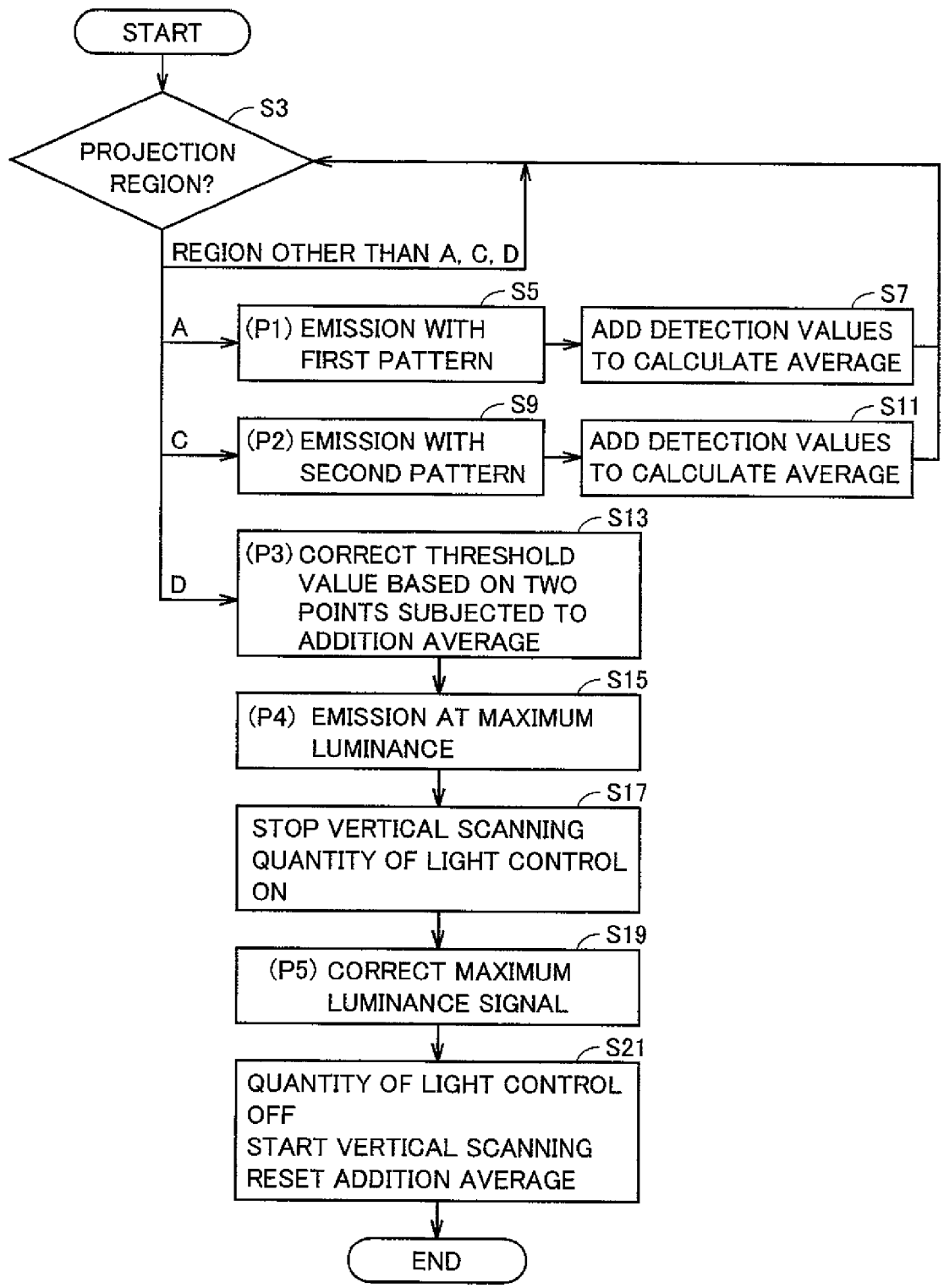
FIG. 10 is a process flowchart in accordance with the embodiment of the present invention.

Next, the process of maintaining the luminance (the quantity of emission light of LD) of laser light applied to projection plane 230 at an appropriate level in image display device 300 will be described in accordance with the flowchart in FIG. 10. P1-P5 in FIG. 10 correspond to points P1-P5 in FIG. 1.

A program in accordance with this flowchart is stored beforehand in a not-shown memory. CPU 101 reads and executes the program from the memory so that each portion of image display device 300 is controlled and the process in accordance with the flowchart is then realized.

Here, it is assumed that image data is formed of 60 frames per second. Every time an image of each frame is displayed, the process in accordance with the flowchart shown in FIG. 10 is started.

First, when image display device 300 is powered on and the start of display of contents is designated, image data of the contents is read by control portion 301 from image data storage portion 302. The read image data is provided to gradation signal generation portion 31 1 and scanning signal generation portion 312, so that laser light is applied to projection plane 230 in accordance with the image data, thereby displaying an image.

In this state, first, in step S3, region detection portion 303 receives position signal 111 indicating the present position of the laser light spot and detects in which of regions A, B, C, and D the present spot exists. The detection result is output to laser driver circuits 121, 122, and 123, as signals 5R, 5G, and 5B.

The respective signal generation portions 151 of laser driver circuits 121, 122, and 123 detect that the present spot exists in region A, based on the received signals 5R, 5G, and 5B to generate and output signals 6R, 6G, and 6B based on first pattern 157 (step S5). Therefore, the quantity of light in accordance with first pattern 157 is emitted from red laser 202, green laser 201, and blue laser 203.

Here, addition average portion 307 accumulatively adds the received light level pixel by pixel, based on the received quantity of light detection signal 237, in a period during which the spot exists in region A, based on the signal provided from region detection portion 303, and calculates the addition average value AC for storage (step S7). Addition average value AC is calculated and stored in a similar manner for red laser 202, green laser 201, and blue laser 203.

On the other hand, when it is detected that the present spot exists in region C, based on the input signals 5R, 5G, and 5B, the respective signal generation portions 151 of laser driver circuits 121, 122, and 123 generate and output signals 6R, 6G, and 6B based on second pattern 158 (step S9). Therefore, the quantity of light in accordance with second pattern 158 is emitted from red laser 202, green laser 201, and blue laser 203.

At this moment, addition average portion 307 accumulatively adds the received light level pixel by pixel based on the input signal 237, in a period during which the spot exists in region C, based on the signal provided from region detection portion 303, and calculates the average value CC for storage (step S11). Average value CC is calculated and stored in a similar manner for red laser 202, green laser 201, and blue laser 203.

Furthermore, when region detection portion 303 detects that the present spot exists in region D, quantity of light control period detection portion 305 converts signal 112 to a signal level designating the start of period T3 of region D for output.

Threshold correction portion 309 receives signal 112, and when it is sensed that the present spot exists in region D and period T3 has started based on signal 112, threshold correction portion 309 calculates the expression of straight line H2 using addition average values AC and CC, calculates the value of threshold current I2 using the calculated expression, and outputs a threshold correction signal designating the calculated value of corrected threshold current I2 (step S13). At this moment, threshold correction signals 2R, 2G, and 2B are generated in the similar procedure and output to laser driver circuits 121, 122, and 123, respectively.

Thus, in laser driver circuit 121, threshold current generation portion 131 receives threshold current (for example, threshold current I2 in FIG. 1) in accordance with threshold correction signal 2R at the input terminal of switch 160 connected thereto. The similar operation is also performed in each of the other laser driver circuits 122 and 123.

In the following period T4, the processes in steps S15, S17, and S19 are performed. First, in step S15, control portion 301 instructs maximum luminance signal generation portion 310 to generate and output maximum luminance signals 3R, 3G, and 3B at room temperature. On the other hand, in switch control portion 133, signal 6R in accordance with third pattern 159 is generated and output based on signal 5R. Thus, the input terminal of switch 160 connected to gradation current control portion 132 is supplied with the distributed driving current in accordance with maximum luminance signals 3R, 3G, and 3B at room temperature. Therefore, laser diodes 136 of red laser 202, green laser 201, and blue laser 203 are supplied with driving current indicating maximum luminance MAX in FIG. 1 (see point P4 in FIG. 1) to emit light. The quantity of light at this point of time is detected by laser power detector 204, so that quantity of light detection signal 23 7 indicating the detected quantity of light is output.

In addition, at this moment, signal AT changes from 'OFF' to 'ON' and switch 135 switches from the open state to the close state. As a result, quantity of light detection signal 1R of quantity of light detection signal 237 indicating the quantity of emitted light based on the maximum luminance signal is input to quantity of light control circuit 134.

It is noted that until period T4 is ended, the level of signal 6R and the current level supplied to each laser diode 136 of red laser 202, green laser 201, and blue laser 203 are held.

Next, in step S17, stop/restart portion 306 outputs signal 113. Thus, in the 'ON' period of signal AT, the signal level of vertical drive timing signal VT is held (not changed). Accordingly, the movement of the spot in the vertical direction is stopped.

In the next step S19, quantity of light control circuit 134 corrects the level of the maximum luminance signal using characteristic data 105 of L-I shown by straight line H1 in FIG. 1, which is read from a prescribed memory region of CPU 101. In other words, quantity of light control circuit 134 detects difference D between the luminance light intensity L) indicated by detection signal 1R of the quantity of light emitted from each laser diode 136 in step S15 and the luminance (light intensity L) indicated by the maximum luminance signal and provides a signal of the detected difference D to gradation current generation portion 132.

Gradation current generation portion 132 detects by calculation the value of driving current I shown by point PS in FIG. 1 for obtaining maximum luminance signal MAX, based on the signal of difference D provided from quantity of light control circuit 134 and the expression of straight line H2 detected in step S13. Thus, the corrected driving current I for obtaining maximum luminance signal MAX is detected. The current signal based on the corrected driving current I for obtaining the maximum luminance signal MAX is distributed and supplied to the respective input terminals of switches 160 connected to gradation current control portion 132.

Therefore, when signal 6R of switch control portion 133 brings all of switches 160 into the ON state, laser diode 136 is supplied with driving current I with the value of point PS in FIG. 1, so that the quantity of emission light exhibits maximum luminance MAX at room temperature. It is noted that the current value distributed to the input terminal of switch 160 at this moment is held until a signal of a new corrected driving current is supplied by quantity of light control circuit 134 in the next 'ON' period of signal AT. When, a signal of the next, new corrected driving current is supplied, the current value of the input terminal of switch 160 is once set to a zero level, and the new corrected driving current is thereafter distributed and supplied to the input terminal of switch 160.

The process in step S19 is performed in a similar manner for laser driver circuits 121, 122, and 123.

Next, when the ON period of signal AT is ended, the process in period T5 (step S21) is performed. In period T5, switch control portion 133 sets all of switches 160 to the open state by signal 6R. Therefore, laser light is not emitted.

Furthermore, in step S21, the held level of vertical drive timing signal VT starts to change, resulting in that the laser light spot moves up to the upper left end of projection plane 230. When the spot exists in the upper left end portion, the values of addition average values AC and CC stored in addition average portion 307 are reset to the initial value (for example, zero) in preparation for the next correction of driving current I. In addition, the values of addition average values AC and CC are set to the initial value when image display device 300 is powered on.

In display of the frame of the next order after driving current I is corrected, the gradation of the image can be controlled in the corrected gradation control region E2, so that the image can be displayed with the requested gradation being satisfied.

In the present embodiment, in a period during which signal AT is ON, that is, in the quantity of light control operation period, scanning in the vertical direction is stopped. Therefore, even if laser light is applied with the maximum luminance in order to detect the corrected gradation control region E2, the portion irradiated with the maximum luminance in region D can be minimized. Therefore, discomfort for the user monitoring contents images can be prevented.

Furthermore, in order to make time until light intensity correction is ended, the amplitude of vertical driving signal VT may be temporarily increased (see the broken line in a part TM in FIG. 8).

In addition, light-receiving portion 210 may also serve the function of laser power detector 204. In this case, laser power detector 204 can be eliminated, thereby reducing the number of components.

In the present embodiment, eight switches 160 are provided based on that the maximum gradation is 256. However, 256 switches may be provided.

Furthermore, in the present embodiment, region D is provided on the lower side of projection region B. However, region D may be provided on the upper side.

Furthermore, the laser driver circuit may drive the corresponding laser in accordance with the PWM (Pulse Width Modulation) scheme.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image display device irradiating a projection plane with laser light for displaying an image on said projection plane, comprising:
    a laser receiving a driving signal and outputting said laser light with a quantity of light in accordance with a level of received said driving signal;
    an irradiation position control unit controlling a spot position on said projection plane to be irradiated with said laser light in accordance with image data;
    a position detection unit detecting a position of a spot of said laser light on said projection plane controlled by said irradiation position control unit;
    a quantity of light detection unit detecting a quantity of light of said laser light output by said laser; and
    a driving signal correction unit correcting a level of said driving signal, wherein
    said projection plane includes a projection region on which said image is projected when said laser receives said driving signal in accordance with image data and a non-projection region irradiated with said laser light when said laser receives said driving signal in accordance with prescribed data,
    said non-projection region is a region for said irradiation position control unit to move the spot of said laser light to said projection region, and
    when said position detection unit detects that a position of said spot exists in said non-projection region, said driving signal correction unit (i) detects a correlation between a quantity of light detected by said quantity of light detection unit and a level of said driving signal in accordance with said prescribed data and (ii) compares a detection characteristic value of said laser indicated by detected said correlation with a characteristic value at room temperature of said laser indicating a correlation between said quantity of light of said laser and a level of said driving signal at room temperature to correct the level of said driving signal in accordance with said image data based on a comparison result.

2. The image display device according to claim 1, wherein
    said driving signal includes a threshold signal for said laser to start emission and a gradation signal designating a gradation of said image in accordance with said image data, and
    said driving signal correction unit corrects a level of said threshold signal and a level of said gradation signal based on said comparison result.

3. The image display device according to any one of claims 1, wherein in a period of time during which said position detection unit detects that the position of said spot exists in said no-projection region, said irradiation position control unit fixes a spot position on said projection plane to be irradiated with said laser light.

4. The image display device according to any one of claims 1, wherein when said position detection unit detects that the position of said spot exists in said non-projection region, a quantity of light detected by said quantity of light detection unit is an average value of the quantity of light detected pixel by pixel in said non-projection region.

5. The image display device according to claim 2, further comprising a maximum luminance driving unit outputting said driving signal having a level for outputting laser light at maximum luminance indicated by said characteristic value at room temperature when said position detection unit detects that the position of said spot designates said non-projection region, wherein
    said driving signal correction unit compares a quantity of light detected by said quantity of light detection unit when said driving signal is output to said laser by said maximum luminance driving unit with a quantity of light specified by said maximum luminance indicated by said characteristic value at room temperature to correct a level of said gradation signal based on a comparison result.

6. The image display device according to any one of claims 2, wherein in a period of time during which said position detection unit detects that the position of said spot exists in said no-projection region, said irradiation position control unit fixes a spot position on said projection plane to be irradiated with said laser light.

7. The image display device according to any one of claims 2, wherein when said position detection unit detects that the position of said spot exists in said non-projection region, a quantity of light detected by said quantity of light detection unit is an average value of the quantity of light detected pixel by pixel in said non-projection region.

8. The image display device according to any one of claims 5, wherein in a period of time during which said position detection unit detects that the position of said spot exists in said no-projection region, said irradiation position control unit fixes a spot position on said projection plane to be irradiated with said laser light.

9. The image display device according to any one of claims 8, wherein when said position detection unit detects that the position of said spot exists in said non-projection region, a quantity of light detected by said quantity of light detection unit is an average value of the quantity of light detected pixel by pixel in said non-projection region.

10. The image display device according to any one of claims 5, wherein when said position detection unit detects that the position of said spot exists in said non-projection region, a quantity of light detected by said quantity of light detection unit is an average value of the quantity of light detected pixel by pixel in said non-projection region.

* * * * *